Sept. 13, 1949.  A. E. SCHUBERT ET AL  2,481,694
ILLUMINATION CONTROL FOR PHOTOGRAPHIC
COPYING APPARATUS
Filed April 5, 1946
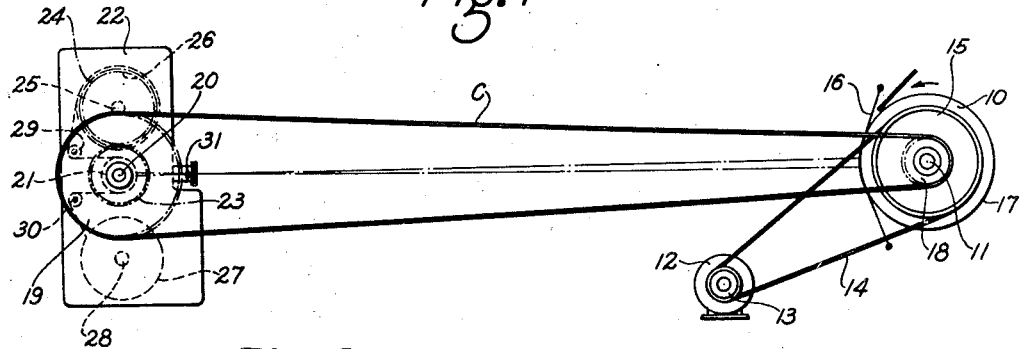
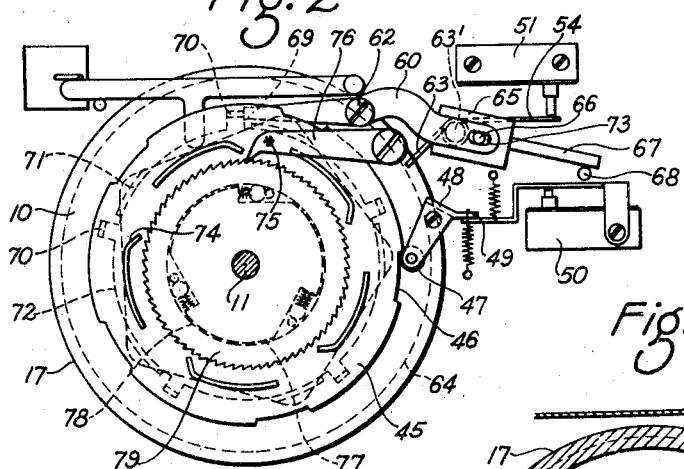
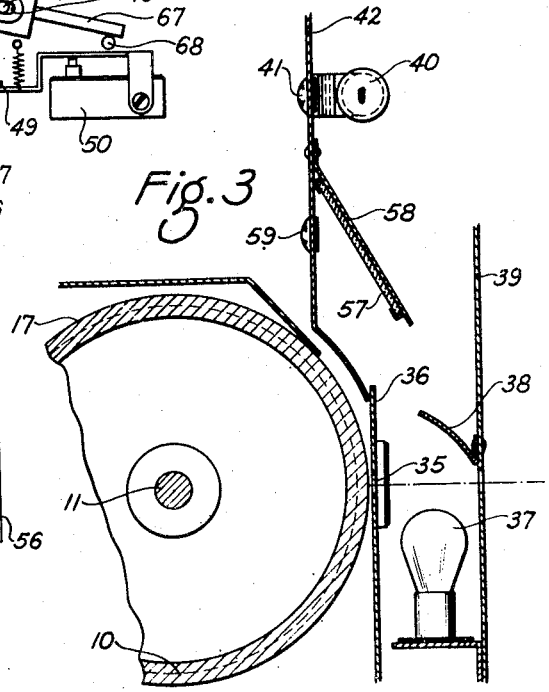
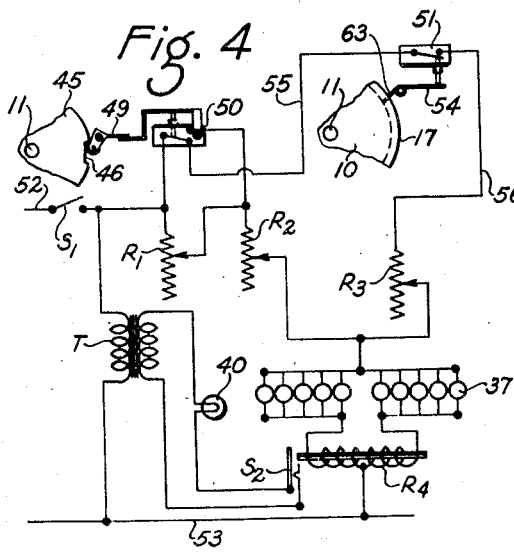
Alvin E. Schubert
Harvey P. Hintz
INVENTORS
BY
ATTORNEYS Patented Sept. 13, 1949

2,481,694

UNITED STATES PATENT OFFICE 2,481,694

ILLUMINATION CONTROL FOR PHOTOGRAPHIC COPYING APPARATUS

Alvin E. Schubert and Harvey P. Hintz, Rochester, N. Y., assignors to Eastman Kodak Company, Rochester, N. Y., a corporation of New Jersey Application April 5, 1946, Serial No. 659,900

8 Claims. (Cl. 88—24)

This invention relates to photographic copying apparatus and more particularly to a control for providing proper illumination of the photographic field during the various stages of the operating cycle of the apparatus, and an indicating means for indicating to the operator that the illuminating system is functioning properly.

The primary object of the present invention is the provision of a control for a photographic copying apparatus in which a document controlled member supervises the application of an actinic illumination voltage to the illuminating circuit during copying and a lower voltage insufficient for actinic illumination during the standby condition of the apparatus.

Another object of the present invention is the provision of a control for a photographic copying apparatus in which a document controlled member cooperates with a clutch to supervise the engagement and disengagement of a power clutch and the application of a variable voltage to the illuminating circuit in synchronism with the movement of the document through the apparatus.

Still another object of the present invention is the provision of a control for a photographic copying apparatus which is associated with the illuminating circuit for supervising, in accordance with the movement of the document through the apparatus, the insertion of a variable voltage into the illuminating circuit.

A still further object of the present invention is the provision of an indicating device for a photographic copying apparatus to indicate to the operator the proper functioning of the illuminating circuit and the illuminating means.

Other objects of the invention will be suggested to those skilled in the art by the following disclosure.

When a document is copied photographically, the document is usually moved continuously past an exposure aperture in the field of the camera and illuminated by a bank of lamps adjacent the exposure aperture. After the document has been photographed, the lamps are usually automatically turned off until the next document enters the photographic field when they are again automatically turned on. As is well known, the filaments of a lamp require a certain period of time after their energization to reach their full brilliance or intensity or illumination. This heating period or lag produces a noticeable effect on the first portion of the document image in the film, namely, an underexposure of the first portion or leading edge of the document. It has been found that the filament lag is of such magnitude, particularly when the voltage for proper exposure is relatively low, that it is impractical to close the illuminating circuit early enough to prevent underexposure of the first portion or leading edge of the document image on the film.

It has also been found that when one of the lamps in either one of the banks burns out or fails, the document image on the film is of unequal density. The operator, however, usually has no way of determining whether or not all of the lamps are being energized aside from inspecting them periodically. Indicating devices are well known for signalling the improper functioning of the lamp bank as a unit, but not for indicating the failure of an individual lamp.

In the present invention, the above-mentioned difficulties are overcome by maintaining energization of the lamps at all times while the machine is in use by providing a standby circuit for the lamps with a voltage which is only sufficient to heat the lamp filaments and which will not produce actinic illumination. When a document is inserted in the apparatus for copying, the standby circuit is replaced by an overvoltage circuit which brings the lamps to their full intensity of illumination before the document reaches the exposure aperture. By the time the document has reached the exposure aperture, the over-voltage circuit is replaced by a normal operating circuit which returns the illuminating circuit to a predetermined voltage for copying and maintains this voltage until the document has cleared the exposure aperture. When the document has cleared the exposure aperture, the normal circuit is replaced by the standby circuit until the next document is in position. By providing the above-mentioned circuits, the lag due to the constant reheating of the lamp filaments is eliminated and the image of the document being copied does not have an underexposed leading edge.

Since the lamps are energized as long as the apparatus is in use, it is a simple matter to provide a signal means for the operator to indicate whether or not the lamp banks are functioning by reflecting the light from the bank to a transparent window directly in front of the operator. Also, by using a relay whose coil has two separate windings and which are connected so that each winding is in series with one-half of the lamp bank, individual lamp failure can be noted by the flashing of a signal in front of the operator.

Reference is hereby made to the accompanying drawing in which similar reference characters designate similar elements and in which:

Fig. 1 is a schematic side elevation of a photographic copying apparatus;

Fig. 2 is an end elevation of the control arrangement;

Fig. 3 is a partial end elevation in section showing the relation of the illuminating means and the exposure aperture to the feeding means; and Fig. 4 is a wiring diagram of the electrical circuits embodied in the present invention.

As is similar to other photographic copying apparatus, the apparatus disclosed includes a photographic field and an exposure position, a feeding means for moving documents continuously through the photographic field, and an advancing means for moving a light-sensitive material in synchronism with the movement of the document through the exposure position.

The feeding means which is preferred is similar to that disclosed in U. S. Patent 1,957,889, Hopkins et al., for a Photographic recording apparatus. Such a feeding means may include a feeding drum 10 which is mounted on the shaft 11. The motor 12 has a pulley 13 fixed to its shaft and by means of the belt 14 and the pulley 15, which is fixed to the shaft 11, drives the drum 10. A plurality of wires 16 under suitable tension extend part way around the periphery of the drum 10 and hold the documents against the outer layer 17 of the drum 10.

The advancing means for moving the light-sensitive material continuously through an exposure position comprises a sprocket 18 fixed to the shaft 11 and connected by an endless chain C to the sprocket 19 and the shaft 20 which may be connected in any suitable manner to rotate the roller 21 within the film unit 22. A gear 23 may be mounted on the shaft 20 and meshes with a gear 24 on a shaft 25 which is connected in any suitable manner to the take-up roll 26 within the film unit 22.

The film unit 22 may be constructed in any well known manner but is preferably built according to the disclosures of the aforementioned patent. Such a camera includes a supply roll 27 which is preferably mounted on a spindle 28 and includes a pair of guide rollers 29 and 30. The film path in such a film unit is preferably as follows: from the supply roll 27, around the guide roller 30, around roller 21, around guide roller 29, and to the take-up roller 26. An objective mount 31 is mounted in the front wall of the film unit 22 and has optical characteristics corresponding to the distance between the photographic field on the surface of the drum 10 and the exposure position on the surface of the roller 21. The limiting rays through the objective and for the photographic field and the exposure position are indicated by broken lines in Fig. 1.

The operation of the apparatus thus far described will be briefly related. The motor 12 drives the feed drum 10 in the direction indicated by the arrow in Fig. 1. The documents are fed between the surface 17 of the drum 10 and the wires 16 and are moved through the photographic field by rotation of the drum 10. At the same time, the control arrangement, which will be only described in part herein and which is fully described in U. S. Patent 1, 976,346, C. J. Hughey, Control for a photographic recording apparatus, accomplishes the connection between the feeding means and the advancing means so that sprocket 18, sprocket 19, roller 21 and take-up roll 26 are rotated. The ratio between sprockets 18 and 19 and gears 23 and 24 may be readily determined so that the film is advanced in synchronism with the movement of the document through the photographic field.

Coming now to the invention, the exposure aperture 35 in the partition 36 is illuminated by a bank of lamps 37 which are in two groups and connected in parallel, as shown in Fig. 4. A reflector 38 is mounted on the partition 39 for reflecting as much of the stray light as possible into the exposure aperture 35.

The first indicating means comprises a lamp 40 which is mounted behind a transparent window 41 on the partition 42. The lamp 40 is energized by the unbalanced energization of the lamp bank 37, as will be more fully described hereinafter.

The control means comprises the control disk 45 which is mounted on the shaft 11, see Fig. 2, and constitutes a part of the above-mentioned Hughey patent. The periphery of the disk 45 is provided with a plurality of dwells 46 which operate the cam roller 47 mounted on the pivoted bracket 48, the tail 49 of which operates the normally closed switch 50.

A document controlled member is adapted to assume a normal position for blocking the control member of the control cluch but is movable by the passage of a document through the feeding means to a control position in which it makes abutment after predetermined rotation of the control member with the projections thereon. Such a control member preferably includes an arm 60 which is intermediately pivoted to a post extending from the side frame by means of a bolt 62. A plurality of fingers 63 which extend into peripherial grooves 64 in the surface of the outer layer 17 of the drum 10 are mounted on the shaft 63' which is journalled in the side frames, not shown, but has fixed to one end thereof a counterweight 65. The counterweight 65 carries a pin 66 which engages the slot 73 in the end of the arm 60 and has a rod 67 attached thereto which rests upon a stud 68 so that the arm 60 and the fingers 63 are normally maintained in the position shown in Fig. 2. The other end of arm 60 has a lip 69 which is adapted to alternately engage the lugs 70 and 71 on the control clutch control member 72.

The operation of the control arrangement is as follows: The document is introduced into the feeding means between the wires 16 and the drum 10. The front or leading edge of the document trips finger 63 and through the pin 66 and the slot 73 rotates the arm 60 in a clockwise direction so that lip 69 no longer abuts the lug 71. The springs of the control clutch now permit engagement between the elements of the control clutch and the control clutch control member or circular plate 72 executes a predetermined rotation. The control disk 45 also executes such a predetermined rotation and the portion 74 of the control disk raises pin 75 and pawl 76 out of engagement with the toothed periphery of the power clutch control member 79. This permits the engagement of the elements 77 and 78 of the power clutch. Thus it will be noted that there is a predetermined delay between the tripping of finger 63 and the engagement of the power clutch to operate the film unit drive. This leading interval is for the purpose of permitting the document to move into the photographic field and eliminates the necessity of locating the finger 63 within the photographic field. The rotation of the control clutch control member continues until the other lug 71 comes into abutment with the lip 69 in the arm 60, whereupon the control clutch is disengaged, but the power clutch continues to drive the advancing means for the light-sensitive strip material.

After the rear or trailing edge of the document passes the finger 63, the document controlled member returns to its normal position and the lip 69 moves out of abutment with the lug 71. This permits engagement of the control clutch and the consequent predetermined rotation of the control clutch control member 72 and the control disk 45. As the predetermined rotation proceeds, the portion 74 permits the pawl 76 to drop into engagement with the toothed periphery of circular plate 79 to disengage the power clutch and the succeeding lug 70 comes into abutment with the lip 69 of arm 60 to accomplish disengagement of the control clutch. Again the delayed action for disengagement of the clutches which is provided by the predetermined rotation is selected so that the rear edge of the document has an opportunity to pass through the photographic field before the film unit drive is disconnected.

The control disk 45 controls the operation of the normally closed switch 50 and the finger 63 controls the operation of the normally open switch 51. Both of the switches are connected in the circuit for the lamps 37, as shown in Fig. 4. The line 52 contains a master switch $S_1$ which is closed to start the apparatus. It is understood, of course, that the circuit for the motor 12 and various other circuits are also controlled by the closing of the master switch $S_1$, however, these circuits form no part of the present invention and, therefore, have been omitted.

Between document exposures, the switch 51 is normally open and the switch 50 is normally closed so that the current then flows from the line 52 through the adjusted resistances $R_1$ and $R_2$ and the bank of lamps 37. The resistances $R_1$ and $R_2$ are in series with the lamp bank and adjusted so that only a voltage sufficient to maintain the lamp filaments at a dull red color passes therethrough. The low voltage applied to the lamps produces very little actinic light. This circuit, then, is the standby circuit or condition of the apparatus while awaiting a document.

When a document enters the feedway, it trips the finger 63 rotating it counterclockwise, see Fig. 2, thereby releasing the control member 72, as described above, however, the first portion of this movement closes the normally open switch 51 by means of the tail 54 on the finger 63. The tripping of the switch 51 takes place before the document reaches the aperture 35 and before the portion 74 engages the pin 75 to release the pawl 76 from the plate 79. This interval will be referred to hereinafter as the leading interval. When the switch 51 is closed, the current then also flows from the switch 50, through the line 55, through the switch 51, through line 56 to the resistance $R_3$ and thence to the bank of lamps 37. The resistance $R_3$ is also in series with the lamp bank 37 and is considerably less than the sum of the resistances $R_1$ and $R_2$. The net resistance of the two paths then is such that the bank of lamps 37 receive more voltage than is actually needed to obtain correct exposure of the document when it is copied. This relatively high or over-voltage circuit brings the lamps to full intensity very quickly and eliminates the lag normally required for heating the lamp filaments.

As the finger 63 is rotated still farther in a counterclockwise direction by the document, the lip 69 is pivoted away from the lug 70 and the control disk 45 is permitted to rotate in a clockwise direction. The roller 47 is then removed from the dwell 46 and the tail 49 permits the switch 50 to assume its normally open position. This actuation takes place just before the document enters the photographic field. The resistance $R_1$, see Fig. 4, is then short-circuited and the resistance $R_3$ is open-circuited, and the current flow is then through switch 50 and the resistance $R_2$ to the bank of lamps 37. The resistance $R_2$ is adjusted to allow the voltage required for proper exposure to be applied to the lampbank. This circuit then constitutes the normal operating circuit for the lamps during the document copying interval.

When the trailing edge of the document clears the finger 63, the switch 51 is returned to its normally open position and the lip 69 is released from the lug 71 to permit rotation of the control disk 45 and the control member 72. As the member 72 is rotated in a clockwise direction, the roller 47 enters the next dwell on the disk 45 thereby permitting the switch 50 to return to its normally closed position and returning the apparatus to its standby circuit until the next document again trips the finger 63.

In order to warn the operator that one or more of the lamps 37 have failed, a center tap relay $R_4$ whose center tap is connected into the line 53 and whose coil has two separate windings is connected so that each winding is in series with one-half of the lamp bank. The windings are connected so that their magnetic fields are of opposite polarity, and when all of the lamps are functioning properly, the two fields are of equal intensity but of opposite polarity so they cancel each other and the armature of the relay is not attracted. However, when a lamp fails, the energization of the relay becomes unbalanced, that is, more current flows through one winding than through the other and the differential between the two fields attracts the relay armature to close the switch $S_2$ for energizing the signal lamp 40. A transformer T, see Fig. 4, is connected across the lines 52 and 53 to provide a reduced voltage for the signal lamp circuit. As an alternative for the relay $R_4$, a transformer with a center tap primary and a high voltage secondary may be used in which case a neon lamp is used as a signal.

The operator is also provided with a signal to warn him of total failure of the lamp bank. This second signal or indicating means comprises a glass or metal mirror 57 which is secured to a bracket 58 mounted on the inner face of the partition 42. A colored transparent window 59 is mounted in the partition 42 directly below the window 41. The mirror 57 is mounted at such an angle that light from the bank of lamps 37 is reflected through the window 59 when the lamps 37 are brought to full intensity during the leading and copying intervals. The two indicating means provide the operator with warnings for both individual and total lamp failure.

Since many other modifications of the present invention can readily be devised by those skilled in the art, the present disclosure is to be construed in an illustrative and not in a limiting sense. The scope of the invention is defined by the appended claims.

Having now particularly described our invention, what we desire to secure by Letters Patent of the United States and what we claim is:

1. In an apparatus for photographically copying a continuously moving document and having a photographic field, the combination with an illuminating means including two groups of lamps each connected in parallel, and an illuminating circuit for supplying a predetermined voltage to said lamps, of a control means associated with said illuminating circuit for maintaining a standby circuit for supplying to said illuminating circuit a voltage insufficient for actinic illumination during absence of a document from said apparatus, for supervising in accordance with the movement of said document toward said field of an over-voltage circuit for supplying to said illuminating circuit a voltage greater than said predetermined voltage, and for maintaining upon movement of said document through said field a normal circuit for supplying to said illuminating circuit said predetermined voltage.

2. In an apparatus for photographically copying documents and having a photographic field, the combination with a feeding means for moving a document continuously through said field, a document controlled member spaced from said photographic field and movable by a document in said feeding means to an actuating position, an illuminating means including two groups of lamps each connected in parallel, and an illuminating circuit for supplying a predetermined voltage to said lamps, of switch means for normally maintaining a standby circuit for supplying to said lamps a voltage insufficient for actinic illumination during absence of a document from said apparatus and actuated upon movement of said document controlled member to said actuating position by said document in said feeding means for supplying to said lamps a voltage greater than said predetermined voltage and for maintaining a normal circuit for supplying to said lamps said predetermined voltage as said document passes through said field.

3. In an apparatus for photographically copying documents and having a photographic field, the combination with a feeding means for moving a document continuously through said field, a document controlled member spaced from said photographic field and movable by a document in said feeding means to an actuating position, an illuminating means including two groups of lamps each connected in parallel, an illuminating circuit for supplying a predetermined voltage to said lamps and including an inductance coil composed of two equal and opposite windings each connected respectively in series with one group of said lamps, and an indicating means responsive to unbalanced energization of said inductance, of a standby circuit including said illuminating means, a switch means, a resistance, and a second resistance in series with said first mentioned resistance and said lamps for supplying to said lamps a voltage less than said predetermined voltage, an over-voltage circuit including said illuminating means, a second switch means, a third resistance in parallel with said lamps and less than the sum of said first and second resistances and initiated by said document controlled member on movement to said actuating position by said document in said feeding means for supplying to said lamps a voltage greater than said predetermined voltage, and a normal circuit including said illuminating means, said first switch means, said second resistance in parallel with said lamps and for supplying to said lamps said predetermined voltage as said document passes through said field.

4. In an apparatus for photographically copying documents and having a photographic field, the combination with a feeding means for moving a document continuously through said field, a document controlled member spaced from said photographic field and movable by a document in said feeding means to an actuating position, a switch means having two positions, a second switch means movable to open and closed positions, and an incandescent illuminating means energized by a predetermined voltage to illuminate said photographic field, of a standby circuit including said illuminating means and said first mentioned switch means and for supplying a voltage insufficient for actinic illumination to said illuminating means, an over-voltage circuit including said illuminating means and said second mentioned switch means and for supplying to said illuminating means a voltage greater than said predetermined voltage, a normal illuminating circuit for supplying said predetermined voltage to said illuminating means, and a clutch means responsive to said document controlled member for providing a leading interval between engagement of said document controlled member by the leading edge of a document and entry of the leading edge of said document into said photographic field, a copying interval, and a trailing interval between disengagement of the trailing edge of said document from said document controlled member and exit of said trailing edge from said photographic field, said clutch means operating both of said switch means in timed relation to close said over-voltage circuit during said leading interval, to complete said normal illuminating circuit during said copying and trailing intervals, and to complete said standby circuit between the end of the trailing interval and commencement of the next leading interval.

5. In an apparatus for photographically copying continuously moving documents and having a photographic field, the combination with a feeding means for moving a document through said field, a document controlled member spaced from said photographic field and movable by a document in said feeding means to an actuating position, a switch means having two positions, a second switch means movable to open and closed positions, and an illuminating means including two groups of lamps each connected in parallel and energized by a predetermined voltage to illuminate said field, of a standby circuit including said illuminating means and said first mentioned switch means for supplying a voltage insufficient for actinic illumination to said illuminating means, an over-voltage circuit including said illuminating means and said second mentioned switch means for supplying to said illuminating means a voltage greater than said predetermined voltage, a normal circuit for supplying said predetermined voltage to said illuminating means, and a clutch means responsive to said document controlled member for providing a leading interval between engagement of said document controlled member by the leading edge of the document and entry of said leading edge into said field, a copying interval, a trailing interval between disengagement of the trailing edge of said document from said document controlled member and exit of said trailing edge from said field, said clutch means operating both of said switch means in timed relation to close said over-voltage circuit during said leading interval, to complete said normal circuit during said copying and trailing intervals, and to complete said standby circuit between the end of the trailing interval and commencement of the next leading interval.

6. In an apparatus for photographically copying continuously moving documents and having a photographic field, the combination with a feeding means for moving a document continuously through said field, a document controlled member spaced from said photographic field and movable by a document in said feeding means to an actuating position, a switch means having two positions, a second switch means movable to open and closed positions, and an illuminating means including two groups of lamps each connected in parallel and energized by a predetermined voltage to illuminate said field, of a standby circuit including said illuminating means, said first mentioned switch means, a resistance, and a second resistance in series with said first mentioned resistance and said lamps for supplying to said illuminating means a voltage insufficient for actinic illumination, an over-voltage circuit including said illuminating means, said second mentioned switch means, and a third resistance which is less than the sum of the first and second mentioned resistances and in series with said second mentioned switch means and said lamps for supplying to said illuminating means a voltage greater than said predetermined voltage, a normal circuit including said illuminating means, said first mentioned switch means, and said second mentioned resistance for supply to said illuminating means said predetermined voltage, and a clutch means responsive to said document controlled member for providing a leading interval between engagement of said document controlled member by the leading edge of the document and entry of said leading edge into said field, a copying interval, a trailing interval between disengagement of the trailing edge of said document from said document controlled member and exit of said trailing edge from said field, said clutch means operating both of said switch means in timed relation to close said over-voltage circuit during said leading interval, to complete said normal circuit during said copying and trailing intervals, and to complete said standby circuit between the end of the trailing interval and commencement of the next leading interval.

7. In an apparatus for photographically copying documents and having a photographic field, the combination with a feeding means for moving a document continuously through said field, a document controlled member spaced from said photographic field and movable by a document in said feeding means to an actuating position, an illuminating means including two groups of lamps each connected in parallel, and an illuminating circuit for supplying a predetermined voltage to said lamps, of switch means for normally maintaining a standby circuit for supplying to said lamps a voltage insufficient for actinic illumination during absence of a document from said apparatus and actuated upon movement of said document controlled member to said actuating position by said document in said feeding means for supplying to said lamps a voltage greater than said predetermined voltage and for maintaining a normal circuit for supplying to said lamps said predetermined voltage as said document passes through said field, and an indicating means for indicating the proper functioning of said circuits.

8. In an apparatus for photographically copying continuously moving documents and having a photographic field, the combination with a feeding means for moving a document through said field, a document controlled member spaced from said photographic field and movable by a document in said feeding means to an actuating position, a switch means having two positions, a second switch means movable to open and closed positions, an illuminating means including two groups of lamps each connected in parallel and energized by a predetermined voltage to illuminate said field, an illuminating circuit including an inductance coil composed of two equal and opposite windings each connected respectively in series with one group of said lamps, and an indicating means responsive to unbalanced energization of said inductance, of a standby circuit including said illuminating means, said first mentioned switch means, a resistance, and a second resistance in series with said first mentioned resistance and said lamps for supplying to said illuminating means a voltage insufficient for actinic illumination, an over-voltage circuit including said illuminating means, said second mentioned resistances and in series with said second mentioned switch means and said lamps for supplying to said illuminating means a voltage greater than said predetermined voltage, a normal circuit including said illuminating means, said first mentioned switch means, and said second mentioned resistance for supplying to said illuminating means said predetermined voltage, and a clutch means responsive to said document controlled member for providing a leading interval between engagement of said document controlled member by the leading edge of the document and entry of said leading edge into said field, a copying interval, a trailing interval between disengagement of the trailing edge of said document from said document controlled member and exit of said trailing edge from said field, said clutch means operating both of said switch means in timed relation to close said over-voltage circuit during said leading interval, to complete said normal circuit during said copying and trailing intervals, and to complete said standby circuit between the end of the trailing interval and commencement of the next leading interval, and a second indicating means for indicating the proper functioning of said circuits.

ALVIN E. SCHUBERT.
HARVEY P. HINTZ.

REFERENCES CITED

The following references are of record in the file of this patent:

UNITED STATES PATENTS

| Number | Name | Date |
| --- | --- | --- |
| 1,938,828 | Gordon | Dec. 12, 1933 |
| 2,107,074 | Hineline | Feb. 1, 1938 |
| 2,177,135 | Fassel | Oct. 24, 1939 |